US006842891B2

(12) United States Patent
Zhang et al.

(10) Patent No.: US 6,842,891 B2
(45) Date of Patent: Jan. 11, 2005

(54) DYNAMIC ATTRIBUTES FOR DISTRIBUTED TEST FRAMEWORK

(75) Inventors: Weiqiang Zhang, San Jose, CA (US); Konstantin I. Boudnik, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 605 days.

(21) Appl. No.: 10/000,270

(22) Filed: Nov. 14, 2001

(65) Prior Publication Data

US 2003/0055936 A1 Mar. 20, 2003

Related U.S. Application Data

(63) Continuation-in-part of application No. 09/953,223, filed on Sep. 11, 2001.

(51) Int. Cl.[7] ................................................ G06F 9/44
(52) U.S. Cl. ...................................... 717/101; 717/162
(58) Field of Search ........................ 717/101, 110–113, 717/120–127, 162–167; 710/8, 10; 713/1, 2, 100; 709/223

(56) References Cited

U.S. PATENT DOCUMENTS

| | | | | |
|---|---|---|---|---|
| 5,809,329 A | * | 9/1998 | Lichtman et al. ............ 710/8 |
| 6,154,876 A | * | 11/2000 | Haley et al. ............... 717/133 |
| 6,247,128 B1 | * | 6/2001 | Fisher et al. .............. 713/100 |
| 6,321,373 B1 | * | 11/2001 | Ekanadham et al. ........ 717/119 |
| 6,405,364 B1 | * | 6/2002 | Bowman-Amuah ......... 717/101 |
| 6,591,290 B1 | * | 7/2003 | Clarisse et al. ............. 709/205 |
| 6,633,916 B2 | * | 10/2003 | Kauffman ................... 709/229 |
| 6,662,357 B1 | * | 12/2003 | Bowman-Amuah ......... 717/120 |
| 6,718,535 B1 | * | 4/2004 | Underwood ................ 717/101 |
| 6,763,454 B2 | * | 7/2004 | Wilson et al. ................. 713/1 |

OTHER PUBLICATIONS

Renesse et al. Astrolabe: A Robust and Scalable Technology for Distributed System Monitoring Management and Data Mining. ACM. 2003. pp. 164–206.*
Kim et al. Customizable Description and Dynamic Discovery for Web Services. ACM. 2004. pp. 142–151.*
Zheng. Agent Construction in Mobile Surveyor. ACM. 2004. pp. 58–63.*

* cited by examiner

*Primary Examiner*—Wei Y. Zhen
(74) *Attorney, Agent, or Firm*—Martine & Penilla, LLP

(57) ABSTRACT

An invention is provided for customizing attributes of a distributed processing system. An embodiment includes a lookup service capable of advertising attributes of a processing resource, and a processing resource executing an agent process, which is in communication with the lookup service. The processing resource is capable of loading a set of core attributes defining characteristics of the processing resource. Further included are a plurality of dynamic attribute classes and a dynamic attribute list file that provides information concerning the dynamic attribute classes. In use, the agent process reads the dynamic attribute list to obtain the information concerning the dynamic attribute classes, and then loads the plurality of dynamic attribute classes utilizing the information in the dynamic attribute list concerning the dynamic attribute classes.

20 Claims, 7 Drawing Sheets

DYNAMIC ATTRIBUTES FOR DISTRIBUTED TEST FRAMEWORK

CROSS REFERENCE TO RELATED APPLICATIONS

This application is a continuation-in-part of U.S. patent application Ser. No. 09/953,223, filed Sep. 11, 2001, and entitled "Distributed Processing Framework System," which is incorporated herein by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to network software testing, and more particularly, to methods and systems for dynamic attribute updating in a distributed test framework.

2. Description of the Related Art

As the use of software in performing daily tasks is increasing rapidly, assessing software reliability through software testing has become an imperative stage in software development cycle. As is well known, software testing is used to find and eliminate defects (i.e., bugs) in software, which if undetected, can cause the software to operate improperly. In general, a stand-alone computer or a network of computer resources can perform software testing. When a stand-alone computer system is used to perform the software testing, the computer system is programmed to run a test selected by the software user. Comparatively, if a network of computer resources is used, the user is responsible for manually adding and deleting the computer resources to the network, programming the master computer system and the server, initiating the running of a user-selected test, and running the test on the group of dedicated computer systems coupled to the server.

In either scenario, a heavy user interface is required for initiating the software testing on the master computer, scheduling the running of the specific test on the system resources, adding and deleting of the system resources, keeping track of the system resources and their respective hardware and software configuration, and maintaining the system resources. Also, in either case, dedicated system resources perform the software testing. That is, the system resources are designed to solely be used for software testing.

Further, when using integrated testing software, which is often capable of generating reports as well as testing software, test engineers often are unable to directly customize the integrated testing software because the software is developed separately. Specifically, integrated testing software generally is developed to generically fit testing systems. The testing software is then made available to the customers, which utilize the integrated testing software to perform their particular software tests. However, if the customers need to customize the generic integrated testing software to more particular reflect their testing environment, the customer often is unable to do so. As a result, the customer must send a request to the integrated testing software developer to integrate the customer's requirements into the integrated testing software. Thereafter, the developer incorporates the custom test environment requirements into the test software and again deploys the testing software on the customer's test system environment. Unfortunately, this is a long process, often requiring weeks to complete.

In view of the foregoing, there is a need for a flexible methodology and system capable of selecting and utilizing dynamic, cross-platform computer resources to process a computer software. Further, the system should be capable of allowing a user to customize the cross-platform computer resources as needed in a non-complex and efficient manner.

SUMMARY OF THE INVENTION

Broadly speaking, the present invention fills these needs by providing a mechanism for dynamically updating processing resource attributes. In one embodiment, a method is disclosed for customizing attributes of a distributed processing system. At least one core attribute defining a first characteristic of a processing resource is loaded. In addition, a dynamic list file having information concerning a dynamic attribute is read. The dynamic attribute defines a second characteristic of the processing resource. Then, utilizing the information in the dynamic list file, the dynamic attribute is loaded, and the core and the dynamic attributes are registered in a lookup service to advertise the availability of the processing resource to execute software processing jobs having a set of requirements.

In another embodiment, a computer program embodied on a computer readable medium is disclosed for customizing attributes of a distributed processing system. The computer program includes a code segment that loads at least one core attribute that defines a first characteristic of a processing resource. In addition, a code segment that reads a dynamic list file having information concerning a dynamic attribute is included. As above, the dynamic attribute defines a second characteristic of the processing resource. Further included in the computer program is a code segment that loads the dynamic attribute utilizing the information in the dynamic list file, and a code segment that registers the core and the dynamic attributes to a lookup service. The loop service advertises the availability of the processing resource to execute software processing jobs having a set of requirements.

A system for customizing attributes of a distributed processing system is disclosed in a further embodiment of the present invention. The system includes a lookup service capable of advertising attributes of a processing resource, and a processing resource executing an agent process, which is in communication with the lookup service. The processing resource is capable of loading a set of core attributes defining characteristics of the processing resource. Further included in the system is a plurality of dynamic attribute classes, and a dynamic attribute list file that provides information concerning the dynamic attribute classes. In use, the agent process reads the dynamic attribute list to obtain the information concerning the dynamic attribute classes, and then loads the plurality of dynamic attribute classes utilizing the information in the dynamic list file concerning the dynamic attribute classes.

Advantageously, the embodiments of the present invention can continuously update and customize a DTF environment, including during execution of the agent process. Further, the embodiments of the present invention allow users to define new dynamic attribute classes in a non-complex and efficient manner. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Figure 1:
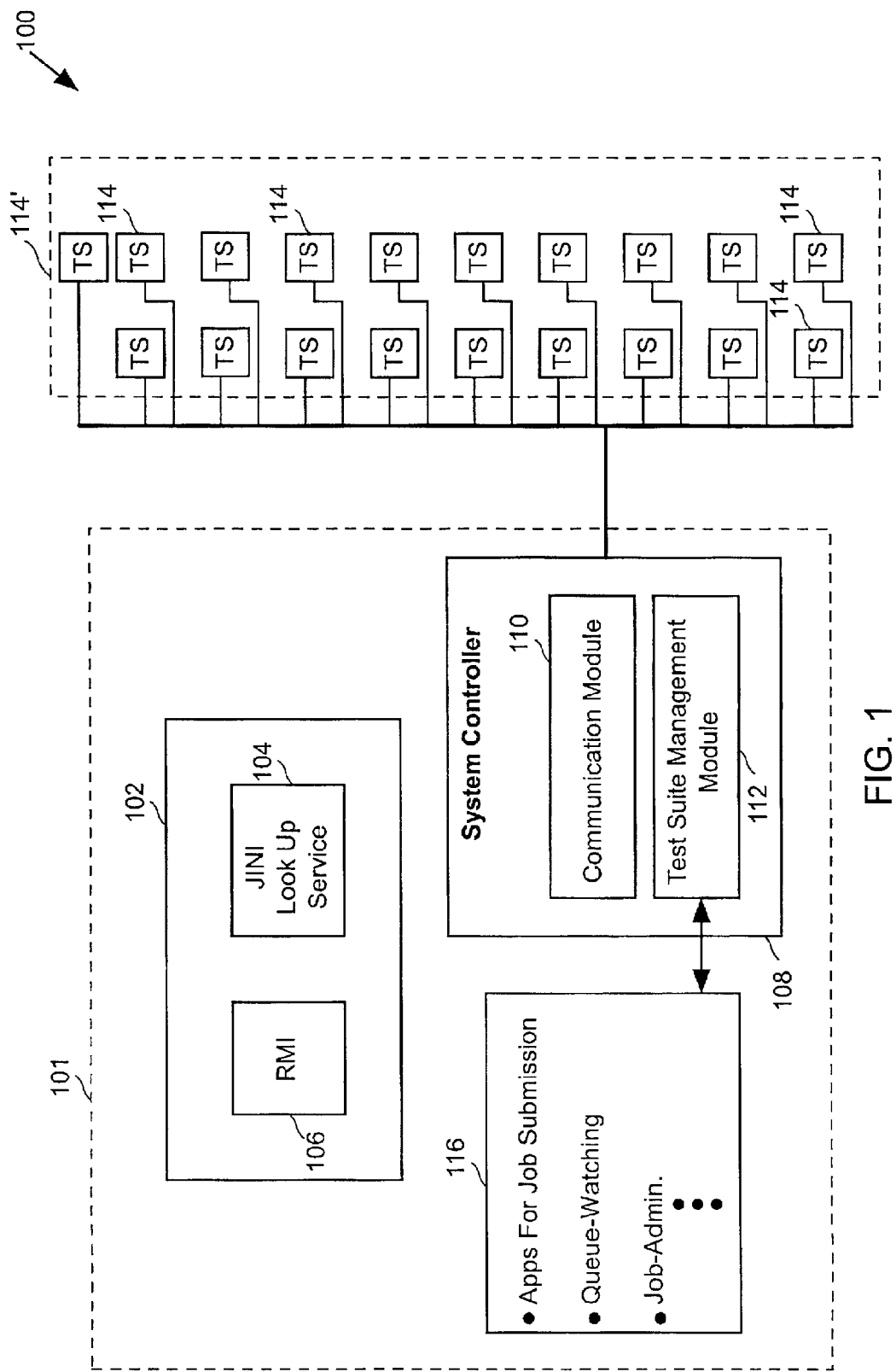
FIG. 1 is a block diagram illustrating a distributed test framework (DTF) system, in accordance with one embodiment of the present invention.

An invention is disclosed for dynamic attributes in a distributed processing framework (DPF) system. Embodiments of the present invention allow users of a DPF to dynamically update system attributes in a non-complex and efficient manner. As a result, users are allowed to customize their DPF environment to better fit their needs. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

As used herein, an "ad-hoc" or a "dynamic" network is defined as a network in which the computer resources may be part of the network temporarily and for a specific length of time (i.e., spontaneous). In one example, the DPF system of the present invention implements the Jini™ (hereinafter "Jini") technology to provide spontaneous interaction between its components. In this manner, the computer systems attach to and detach from the ad-hoc network of processing resources (e.g., computer resources) without disturbing the DPF system. Accordingly, the computer resources of the present invention are not limited to executing processes submitted to the DPF system of present invention.

DPF systems of the embodiments present invention can be distributed test framework (DTF) systems configured to manage test suite execution on cross-platform dynamically networked computer systems. In one implementation, the DTF system can include a server computer system and a plurality of ad-hoc network of processing resources configured to spontaneously interact implementing the Jini technology. The server computer system is configured to include a Jini look up service and a system controller configured to manage the processing of the submitted test suites. In one instance, the plurality of computer resources join the Jini look up service registering their respective proxies and the corresponding attributes. In one example, the system controller searches the look up service for an available suitable computer resource to process each of the submitted test suites. Once a computer resource is selected to run the test suite, the machine service component of the selected computer resource spawns a second service (e.g., process service) to execute the test suite.

As embodiments of the present invention can implement the Jini technology, a brief introduction to Jini is provided below. Nevertheless, this brief introduction to Jini should not be considered as limiting as Jini technology is well known by those skilled in the art. Jini technology is a network architecture that enables the spontaneous assembly and interaction of services and devices on a network of computer systems. Built on the Java platform, Jini technology eliminates the challenges of scale, component integration, and ad-hoc networking encountered in distributed computing environments. Jini simplifies interactions over a network by providing a fast and easy way for clients to use available services. Jini technology is also configured to be wire-protocol and transport-protocol neutral.

Summarily, Jini network technology includes a communication and programming model that enables clients and Jini services to discover and connect with each other to form an impromptu (i.e., spontaneous) Jini community. As Jini is written in Java, Jini implements the mechanism, Java Remote Method Invocation Application Program Interface (API), to move objects around the network.

In one embodiment, a Jini service is configured to employ a proxy to move around the network. As used herein, the proxy is defined as an object having service attributes and communication instructions. Through implementing discovery and join processes, the Jini services are found and thereafter registered with a look up service on a network. As used herein, registering a service is defined as sending the service proxy to all look up services on the network or a selected subset of the look up services. By way of example, the look up service is equivalent to a directory or an index of available services wherein the proxies for each of the services and their associated code are stored. When a service is requested, the proxy associated with the requested service is sent to the requesting client, thus enabling the client to use the requested service. Once dispatched, the proxy is configured to conduct all communication between the client and the Jini service.

In providing an ad-hoc network of computers, in one embodiment, Jini introduces a concept called "leasing." That is, once a service joins the Jini network, the Jini service registers its availability for a certain period of leased time. This lease period may be renegotiated before the lease time is expired. When a service leaves the Jini network, the service entry in the look up service is removed automatically once the service's lease is expired. For further details on Jini technology, please refer to K. Arnold et al., The Jini Specification (1999) and W. Keith Edwards, Core Jini (1999).

As Jini is implemented in the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code." The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Keeping these brief overviews of Jini and Java as they relate to the embodiments of the present invention in mind, reference is now made to FIG. 1 illustrating a block diagram of a distributed test framework (DTF) system 100, in accordance with one embodiment of the present invention. As shown, physically, the DTF system 100 includes two groups of computer systems: (1) a system server group 101, and (2) a test system group 114'. The system server group 101 includes a service component 102 and a system controller 108. The service component 102 is configured to contain a Jini look up service 104 and a Remote Method Invocation (RMI) 106. In one embodiment, the RMI is designed to handle various communication needs. Comparatively, the Jini look up service 104 is a dedicated process running on the master computer system, server, and is configured to function as a central registry. As used herein, the master computer system is defined as the computer system running the system controller 108. As designed, in one embodiment, the master computer system is configured to include both the system controller 108 and the service component 102. However, in a different implementation, each of the system controller 108 and the service component 102 may be included and run by separate computer systems. As designed, the look up service 104 is configured to enable the system controller 108 to locate available computer systems of an ad-hoc network of computer systems to execute a given test execution request using the test system registerable attributes. For instance, the look up service 104 includes registerable attributes, which identify the test machine platform, operating system, and other software and hardware characteristics.

The illustrated system controller 108 includes a communication module 110 and a test suite management module 112. The communication module 110 manages the communication between the system controller 108 and the distributed test systems 114. For instance, the communication module 110 is responsible for locating available test systems 114, running test execution requests, and gathering information regarding the status of the test systems 114. In one example, the system controller 108 manages the communication with the distributed test systems 114 by implementing a plurality of threads. In this manner, the system controller 108 has the capability to communicate with a plurality of test systems 114 in parallel. However, it should be noted that in other embodiments, the system controller 108 can implement any suitable mechanism to manage the communication between the system controller 108 and the distributed test systems 114 (e.g., Jini, RMI, TCP/IP Sockets, etc.).

The test suite management module 112 is responsible for managing the processing of the submitted test suites and the test execution requests. As used herein a test suite is a comprehensive list of data files having commands specifically programmed to initiate a number of functional aspects of the software product being tested. For instance, if the software product being tested is a word processing program, the test suite may activate a spell check command, a cut test command, a paste command, etc. Thus, once the test suite is executed, the test results reveal whether any of the tested commands failed to operate as intended. Also as used herein, once submitted for processing, each test suite becomes a "test execution request." As the processing of different portions of the test suite can be assigned to different test machines, the test suites may be divided into a plurality of test execution requests (i.e., jobs).

By way of example, the test suite management module 112 maintains an inqueue directory designed to include almost all the submitted test execution requests. Once the system controller 108 is initiated, the system controller 108 is configured to read each test execution request from files held in the inqueue directory. Once a test execution request is read, it is put into either a wait queue configured to hold test execution requests waiting to be executed or an execution queue designed to hold test execution requests currently being executed. Further information regarding managing the inqueue directory, wait queue, and execution queue will be provided below. As illustrated, in one example, the test suite management module 112 is configured to manage the software applications and user interfaces implemented for job submission, queue watching, job administration, etc., as shown in 116.

The test system group 114' includes a plurality of test systems 114 having similar or diverse hardware and software configuration. Although shown as a group, the test systems 114 are not necessarily limited to testing. In fact, the test systems 114 can be computers or systems used by employees of a company for normal desktop work. So long as the test systems 114 are associated with the networked group, the processing power of these test systems 114 can be used. In one embodiment, the test systems 114 can be used during normal working hours when the test systems 114 are running, for example, business applications, or during off hours, thus tapping into potentially huge processing resources that would otherwise be left unused. It should therefore be appreciated that test systems 114 do not necessarily have to be solely dedicated to testing or processing for the system server group 101.

In one embodiment, the test systems 114 are configured to execute the test execution requests dispatched by the system controller 108. Each of the test systems 114 runs an agent process (not shown in this Figure) designed to register the respective test system 114 with the Jini look up service 104. In this manner, the agent process for each test system 114 advertises the availability of the associated test system 114. As will be discussed in further detail below, a machine service component of the agent is used to establish communication between the associated test system 114 and the system controller 108. Specifically, by implementing the Jini attributes, the machine service registers the test system 114 characteristics with the Jini look up service 104. The test system 114 attributes are subsequently used by the system controller 108 to locate a test system 114 suitable to execute a specific test execution request.

While the DTF system 100 of the present invention can physically be divided into two groups, logically, the DTF system 100 of the embodiments of present invention comprises three over all components: (1) Job submission and other user interfaces; (2) Test scheduler and system controller; and (3) Test execution on remote or local systems.

For the most part, the job submission and other user interfaces component is a job queuing system having a variety of applications and user interfaces. As designed, the job submission component is configured to perform several tasks such as handling job submission, managing queues, administrating jobs, and administrating the ad-hoc network of the distributed test systems.

By way of example, in one implementation, the user interface may be as follows:

Launch system controller: In one embodiment, launching the system controller 108 is performed by running an appropriate shell script. As designed, the shell script is configured to launch the Jini and RMI support servers.

Kill system controller: Finds substantially all the processes, and once found kills each of the processes, individually.

Submit jobs: Before the system controller 108 is launched, an Extensible Markup Language (XML) formatted test-execution-request file is created in the inqueue directory (e.g., that is preferably part of the test suite management module). In this manner, once the system Controller 108 is launched, the system controller 108 scans the inqueue directory, thus entering almost each and every test execution request into the in-queue (the in-queue being an actual queue, as contrasted with the inqueue directory).

Check queue: In one embodiment, a stopgap Graphical User Interface (GUI) is provided.

Cancel/administer a job: In one implementation, a stopgap GUI is implemented.

Other administrative tasks: In one exemplary embodiment, additional user interfaces are included. For instance, in certain cases, the system controller 108 is configured to implement various input files.

The second logical component, the test scheduler and system controller, includes the system controller 108 configured to perform the function of managing the job queues and dispatching the test execution requests to test system 114 for processing. Thus, the system controller 108 is configured to manage both; the wait queue (i.e., the queue containing the test execution requests waiting to be executed) and the execution queue (i.e., the queue containing test execution requests currently being executed). In one embodiment, the in-queue is analogous to the wait queue.

As designed, the test scheduler and system controller component is configured to include four modules:

Suite MGR: This module maintains a list of the available test suites stored in a known location in the file system. As designed, the test suite descriptions are stored in an XML formatted file in a suite directory.

Log MGR: This module is configured to handle the logging of activities inside the system controller 108 by implementing a plurality of log files having XML format. For instance, this is particularly useful for debug tracing and system statistics charting.

Queue MGR: This module is designed to maintain the two queues, wait queue (i.e., the in-queue) and the execution queue. Specifically, while a job is in any of the queues, an XML formatted file is kept in the queue directory reflecting the current status of the job. Each test execution request is configured to have a list of attributes describing the system characteristics required to execute the test execution request.

Scheduler: This module is configured to manage the dispatch of the test execution requests from the wait queue to the execution queue. In one embodiment, a job is dispatched when (a) the time to execute the job has been reached, and (b) a test system 114 having the required characteristics is available to execute the job.

Figure 2:
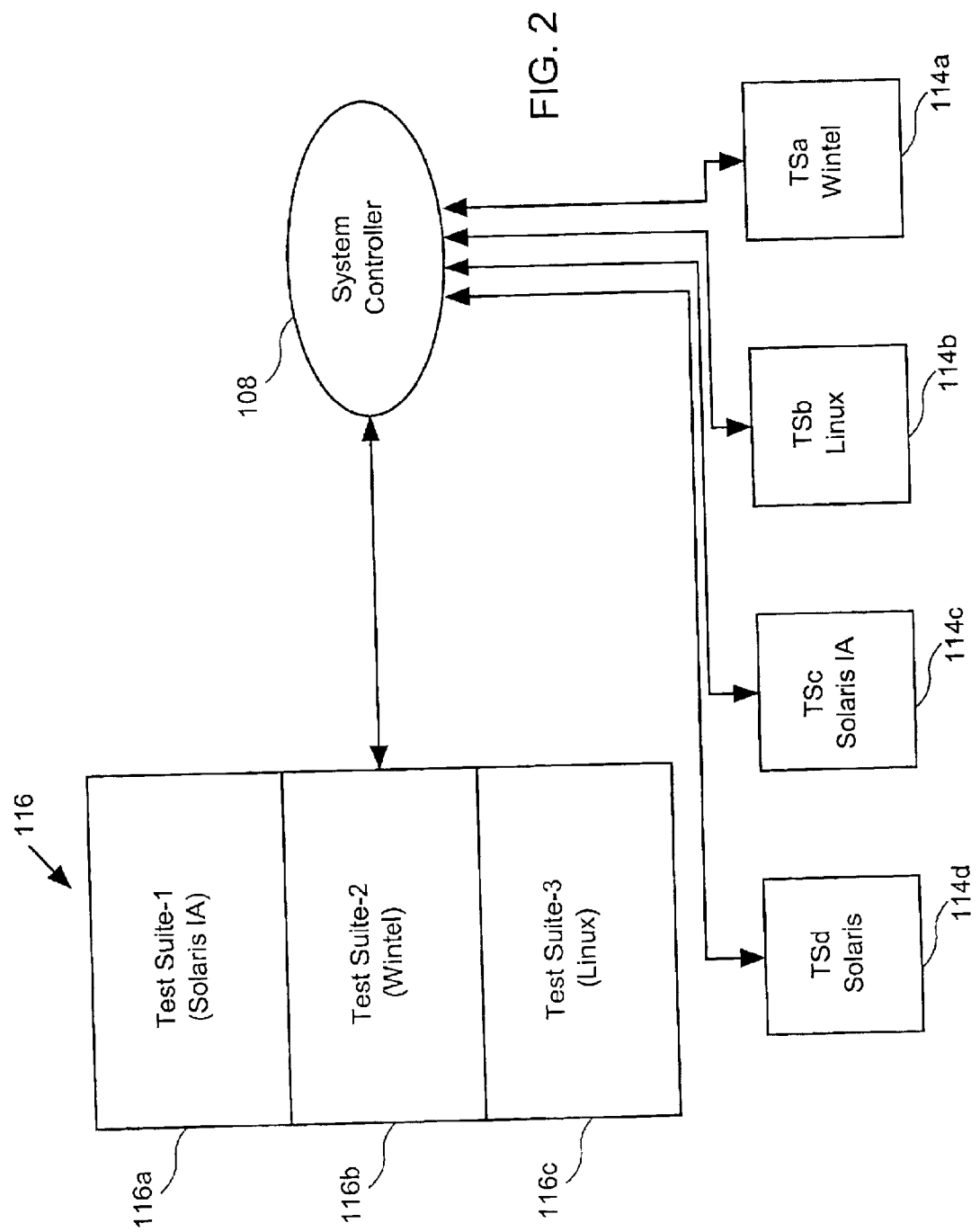
FIG. 2 is a block diagram illustrating the capability of the present invention to intelligently locate an available and suitable test system to execute a test suite, in accordance with another embodiment of the present invention.

Reference is made to a block diagram depicted in FIG. 2 wherein the capability of the present invention to intelligently locate a test system 114 available to execute a test suite is illustrated, in accordance with one embodiment of the present invention. As shown, an inqueue directory 116 contains a plurality of test execution requests 116a, 116b, and 116c. In accordance with one embodiment of the present invention, once the system controller 108 is initiated, the system controller 108 is designed to read each test execution request 116a–116c contained within the inqueue directory 116. As shown, each test suite request 116a–116c must be executed by a test system 114 capable of running the test execution request requirements. For instance, each of the test execution requests 116a, 116b, and 116c must be run on a Solaris IA™ test system, a Wintel™ test system, or a Linux™ test system, respectively. The DTF system 100 of the present invention has the capability to advantageously locate an available test system from a plurality of ad-hoc network of test systems 114a, 114b, 114c, and 114d to execute each of the test execution requests 116a–116c.

As shown in the embodiment depicted in FIG. 2, each of the test systems 114a–114d has a different software and hardware configuration. For instance, while the test system 114a is run on Wintel™ and the test system 114b is run on Linux™, the test systems 114c and 114d are programmed to run on Solaris IA™ and Solaris™, respectively. As will be discussed in more detail below, the machine service for each test system 114a–114c registers the respective test system 114a–114c with the Jini look up service using the Jini attributes. Particularly, the embodiments of the present invention are configured to register the hardware and software configuration for each test system 114a–114d with the Jini look up service 104. In this manner, the system controller 108 can search the Jini look up service 104 implementing the test execution request requirements as search criteria. Thus, as shown in the example of FIG. 2, the system controller 108 of the present invention selects the test systems 114c, 114a, and 114b to execute the test suite requests 116a–116c, respectively.

Figure 3:
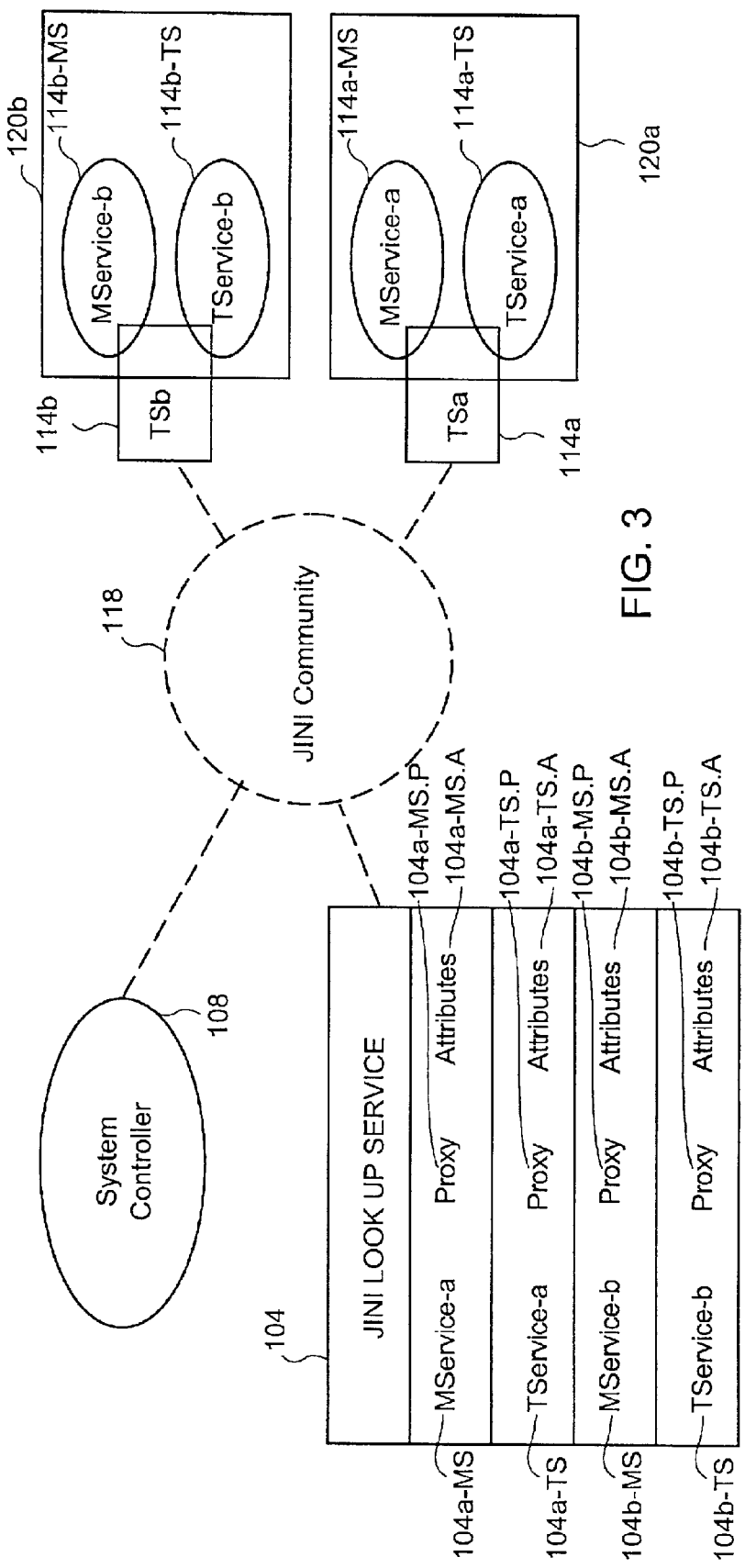
FIG. 3 is a block diagram illustrating the implementation of the test system attributes to locate a suitable test system to process a test execution request, in accordance with yet another embodiment of the present invention.

Implementing the test system attributes to locate a suitable test system to run a test execution request can further be understood with respect to the block diagram shown in FIG. 3, in accordance with one embodiment of the present invention. As shown, the test systems 114b and 114a, the system controller 108, and the Jini look up service 104 communicate to each other using Jini. In one example, the system controller 108, the Jini look up service 104, and the test systems 114a and 114b and all the other resources that are Jini enabled form a virtual Jini community 118.

As shown, the test system 114a runs an agent process 120a responsible for notifying the Jini look up service 104 of the existence and configuration of the test system 114a. In one example, the agent 120a is also designed to export a downloadable image of itself. Beneficially, the downloadable image allows the system controller 108 to ask the test system 114a to initiate running a test execution request while interacting with the test system 114a as the test execution request is being processed.

The illustrated agent 120a involves two Jini services, machine service 114a-MS and test service 114a-TS. The function of the machine service 114a-MS is to advertise the availability of the test system 114a, the characteristics of the test system 114a, and the ability of the test system 114a to launch a test execution request. Additionally, the machine service 114a-MS is designed to be present on the test machine 114a at all times. As such, the machine service 114a-MS is initiated on the test system 114a at the start-up time and is configured to remain active on the test system 114a until the test system 114a is shut down.

Comparatively, the test service 114a-TS is a module configured to encapsulate the test execution request. As designed, the test service 114a-TS is spawned by the machine service 114a-MS and is subsequently launched when the machine service 114a-MS receives a request to start running a test execution request from the system controller 108. Specifically, the new test service 114a-TS is spawned based on the test execution request type. By way of example, in one embodiment, the machine service 114a-MS spawns separate test systems 114a-TS when running Tonga-type, JCK-type, JTREG-type, and shell-type test suites. However, one having ordinary skill in the art must appreciate that in a different example, the machine services of the DTF system of the present invention are configured to spawn other suitable test systems. As shown, similar to test system 114a, the test system 114b is configured to include an agent 120b designed to include a machine system 114b-MS and a test system 114b-TS.

As will be discussed in greater detail below and as shown in the implementation of FIG. 3, the machine service 114a-MS and test service 114a-TS, respectively, register Jini attributes 104a-MS.A and 104a-TS.A of the test system 114a with the Jini look up service 104. For instance, in one embodiment, the sequence of events in registering the machine service 114a-MS and test service 114a-TS may be as follows: Once the test-system 114a discovers and joins the Jini community 118, the test service 114a-MS of the test system 114a registers with the Jini look up service 104. In this manner, the machine service 114a-MS registers a machine service proxy 104a-MS.P and the attributes 104a-MS.A of the machine service 114a-MS with the look up service 104. The Jini attributes 104a-MS.A are then used by the system controller 108 to locate a test service having attributes suitable to run the test execution request.

Once the test system 114a has been selected to run the test execution request, the machine service 114a-MS spawns a test service 114a-TS having the same type as the test execution request. As discussed above, the machine service 114a-MS is configured to spawn a matching test service 114a-TS for each test execution request type. For example, the test system 114a may have the attributes to run a Tonga test execution request and a JTREG type test execution request. In such a situation, the Jini look up service 104 will include two test services each running a different type of test execution request. As a consequence, when the processing of one type of test execution request has concluded, the test service 114a-TS having substantially the same type can be terminated. Thus, for the most part, the test service 104a-TS, 104a-TS.A, and 104-TS.P are designed to substantially exist while the test system 114a is running a test execution request. In this manner, the system controller 108 can determine whether the test system 114a is processing a test execution request. Specifically, this is achieved by the system controller 108 simply querying the Jini look up service 104 as to whether the test system 114a has an associated existing test service.

In addition to registering the attributes 104a-MS.A and 104a-TS.A, the machine service 114a-MS and the test system 114a-TS are configured to respectively register a corresponding machine service proxy 104-MS.P and a respective test service proxy 104-TS.P with the Jini look up service 104. As designed, the system controller 108 implements the machine service proxy 104-MS.P and the test service proxy 104-TS.P to communicate with the test system 114a. Particularly, once the system controller 108 has selected the test system 114a to run the test execution request, the system controller 108 downloads the machine service proxy 104-MS.P from the Jini look up service 104. Once the machine service proxy 104-MS.P is downloaded, the system controller 108 starts communicating with the machine service proxy 104-MS.P rather than communicating directly with the corresponding test system 114a or the machine service 114a-MS.

In a like manner, the test service proxy 104-TS.P is the communication channel between the system controller 108 and the test service 114a-TS. Thus, similar to the machine service 114a-MS, the system controller 108 downloads the test service proxy 104-TS.P from the Jini look up service 104. Thereafter, the system controller communicates with the test service proxy 104-TS.P as if communicating with the test system 114a or the test service 114a-TS. As shown, in the same manner, the machine service 114b-MS and test service 114b-TS register their respective machine service proxy 104b-MS.P and machine service attributes 104b-MS.A as well as the respective test service proxy 104b-TS.P and test service attributes 104b-TS.A with the Jini look up service 104. Further information on DPF system operation can be found in parent U.S. patent application Ser. No. 09/953,223, filed Sep. 11, 2001, and entitled "Distributed Processing Framework System," which is incorporated herein by reference.

As mentioned above, embodiments of the present invention utilize Jini attributes to provide test system 114 information to the system controller 108 via the Jini lookup service 104. Particularly, the embodiments of the present invention register the hardware and software configuration for each test system 114a–114d with the Jini look up service 104 using Jini attributes. In this manner, the system controller 108 can search the Jini lookup service 104 implementing the test execution request requirements as search criteria. To provide test system attributes to an agent process, embodiments of the present invention utilize attribute classes.

Figure 4:
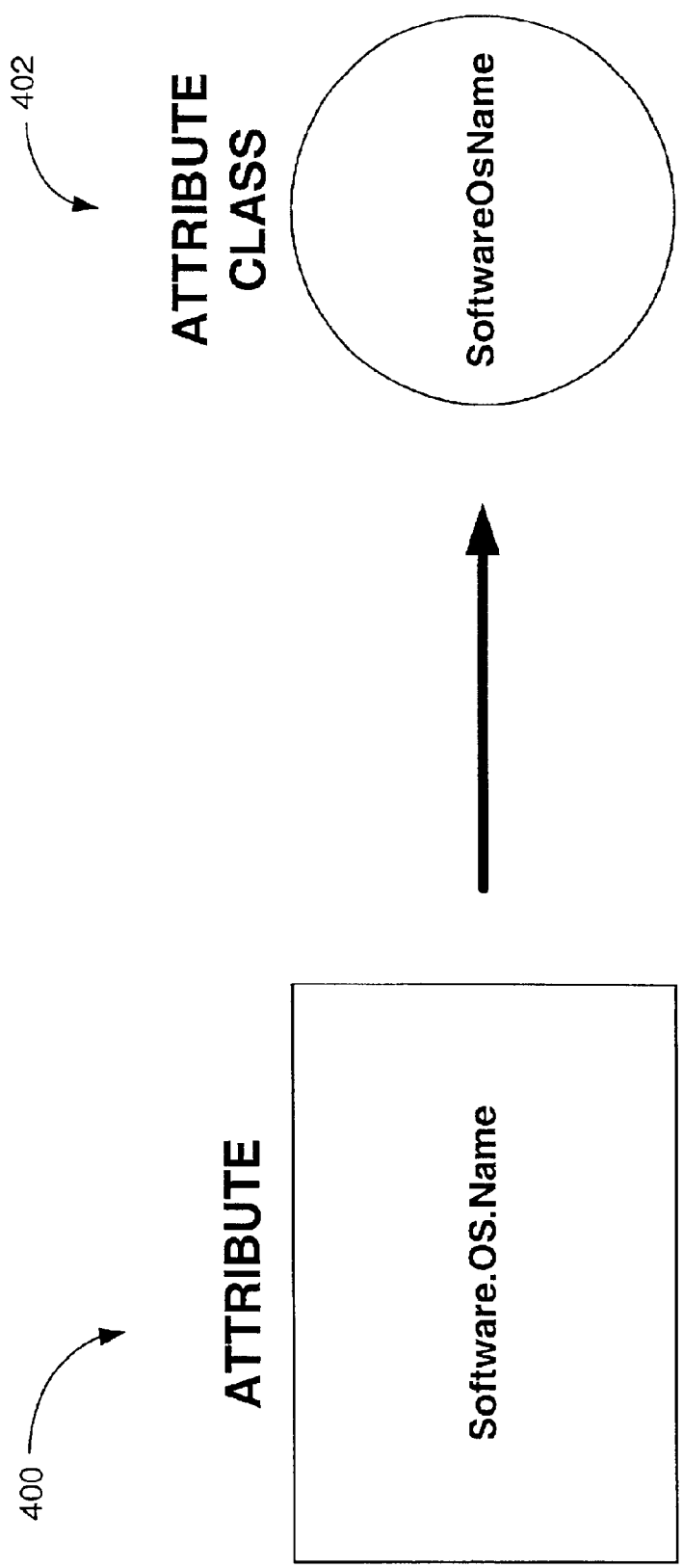
FIG. 4 is a logical diagram showing a Jini attribute and attribute class relationship, in accordance with an embodiment of the present invention.

FIG. 4 is a logical diagram showing a Jini attribute 400 and attribute class 402 relationship, in accordance with an embodiment of the present invention. As shown in FIG. 4, embodiments of the present invention provide Jini attributes 400 that allow users to define characteristics of a test system or test being performed by a test service. These attributes are then provided to an agent process running on the test system, which provides the attributes to the Jini lookup service. For example, an attribute defining the operating system executing on a particular test system may be "Software.OS.Name." If the test system was executing a Linux operating system, the user may define this attribute as "Software.OS.Name=Linux."

Within the agent process, each attribute 400 is represented as an attribute class 402, which is a Java class defining the attribute. For example, the above mentioned attribute "Software.OS.Name" can be represented within the agent process as the class "SoftwareOsName." In this manner, the agent process can provide the attribute class to the Jini lookup service, which makes the attribute available for view by the system controller.

When implementing the embodiments of the present invention, designers can determine a particular core set of attributes that will be useful to most DTF environments. For example, most DTF environments will require attributes defining the type of machine that comprises a test system and the operating system executing on a particular test system. Hence, the embodiments of the present invention can be implementing using a core set of attributes that will be deployed to a user's testing environment. However, special attribute requirements needed by particular users may not be known at the time of deployment. Moreover, users may develop additional attribute requirements in the future. To allow the DTF systems of the embodiments of the present invention to be customized to better suit a user's needs, embodiments of the present invention allow dynamic attributes to be developed and deployed by users in a non-complex and efficient manner.

Figure 5:
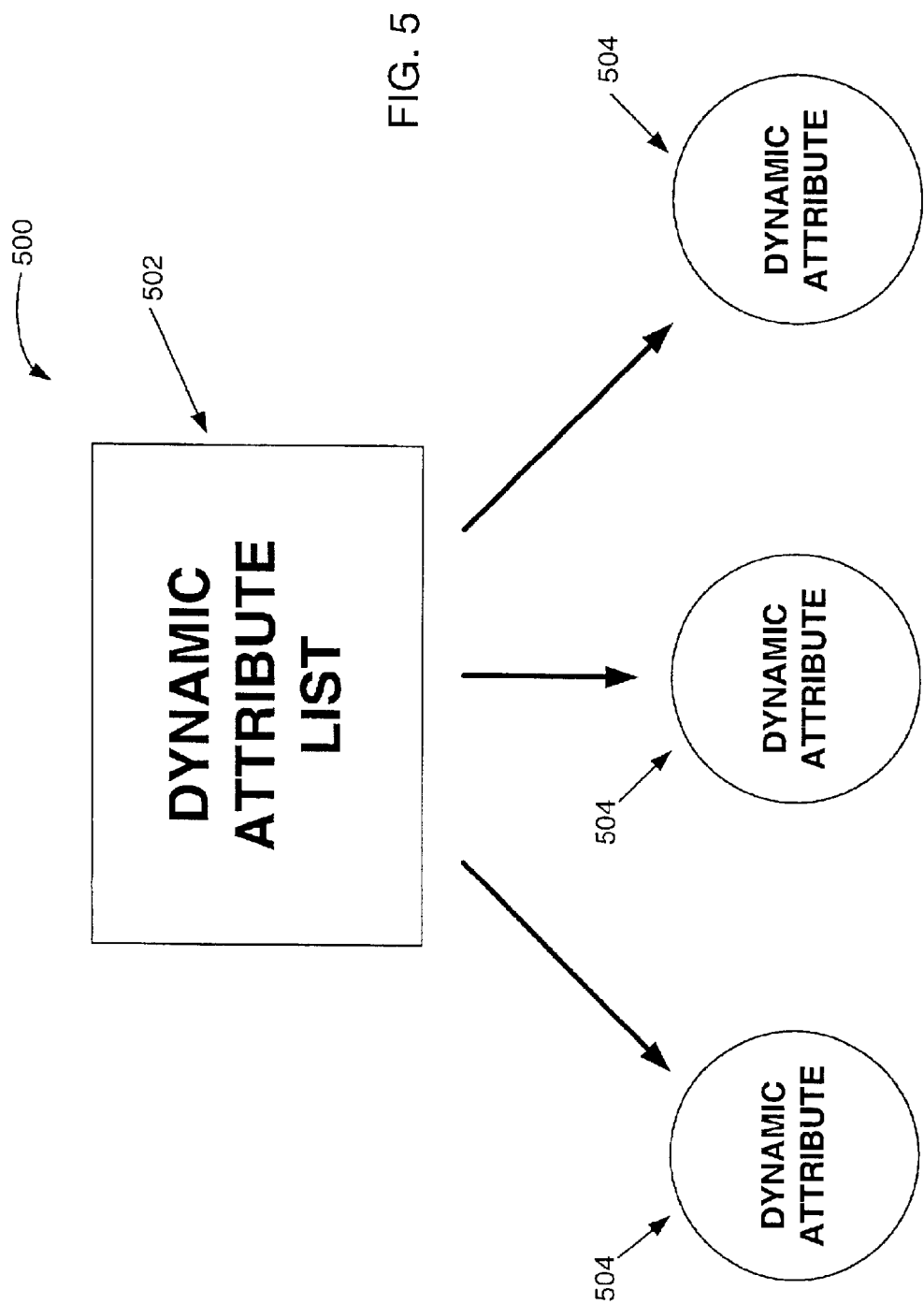
FIG. 5 is a diagram showing a dynamic attribute configuration, in accordance with an embodiment of the present invention.

FIG. 5 is a diagram showing a dynamic attribute configuration 500, in accordance with an embodiment of the present invention. The dynamic attribute configuration 500 includes a dynamic attribute list 502, which provides access to a plurality of dynamic attribute classes 504. As mentioned above, embodiments of the present invention provide a core set of attributes, which most DTF environments can utilize. In addition, embodiments of the present invention allow users to define their own dynamic attribute classes 504, which address specific attribute needs of their particular DTF environment. As such, although the number of core attribute classes is fixed, the number of dynamic attribute classes 504 can vary. To determine which dynamic attribute classes 504 are available, embodiments of the present invention utilize a dynamic attribute list 502.

The dynamic attribute list 502 provides the agent process with a mechanism to determine which dynamic attribute classes are available and where the dynamic attribute classes are located. In use, the agent process reads the dynamic attribute list 502 and loads the dynamic attribute classes 504 listed in the dynamic attribute list 502. Moreover, the dynamic attribute list 502 can be edited after the agent process is executing. In this case, the agent process will re-read the dynamic attribute list 502 and load any new dynamic attribute classes 504 that have been added to the dynamic attribute list 502. Advantageously, the embodiments of the present invention can continuously update and customize a DTF environment, including during execution of the agent process.

As mentioned previously, the embodiments of the present invention allow users to define new dynamic attribute classes 504 in a non-complex and efficient manner. To allow easy creation of dynamic attribute classes, the embodiments of the present invention utilize class inheritance. Inheritance allows a user to define a new class by elaborating upon the definition of an existing class. The new class inherits the characteristics of the original class, and can include additional new characteristics, which may be added to the new class. As such, embodiments of the present invention define a parent attribute class that defines most of the characteristics of a Jini attribute. Table 1 below includes illustrative code for creating a parent attribute class, in accordance with an embodiment of the present invention. Of course, the code can take any form so long as it defines parent attribute class characteristics that subsequent dynamic attribute classes can inherit.

TABLE 1

```
package knight.attribute;
import net.jini.entry.AbstractEntry;
import net.jini.lookup.entry.ServiceControlled;
/**
 *This class is used as an attribute in the lookup system.
 */
public abstract class BasicEntry extends AbstractEntry implements ServiceControlled
{
    public String name;
    /**
    * Public no-arg constructor. Required for all <CODE>Entry</CODE>
    * objects.
    public BasicEntry() {}
    */
    /**
    * Create a new <CODE>FortuneTheme</CODE> with the given theme.
    public BasicEntry(String name) {
        this.name = name;
    }
    */
        public void setValue(String value){
            name = value;
        }
}
```

Users can utilize the parent attribute class to define their own dynamic attribute classes in a non-complex and efficient manner. For example, as mentioned above, one core attribute class that may be defined could be "SoftwareOsName," which defines the type of operating system executing on a particular test system. A user could then define "SoftwareOsName=Linux," which defines the operating system executing on a test system to be Linux. However, there exist many different types of Linux, for example, RedHat, SuSe, and TurboLinux. As such, a particular user may require the type of Linux to be an attribute, which may not be provided in the core set of attribute classes deployed with the DTF environment.

To address this issue, the embodiments of the present invention allow the user to define a new dynamic attribute class for the Linux type, such as "SoftwareOsLinuxType.java," which could be a dynamic attribute class defining the type of Linux executing on a test system. To define this class, the user can inherit much of the class characteristics from a parent attribute class, such as the "BasicEntry" class listed in Table 1. The user can then compile the new dynamic attribute class and list the new dynamic attribute class in the dynamic attribute list 502. As a result, the agent process can add the new dynamic attribute class to the attributes that will be listed for the test system in the Jini lookup service, as described in greater detail next with reference to FIG. 6.

Figure 6:
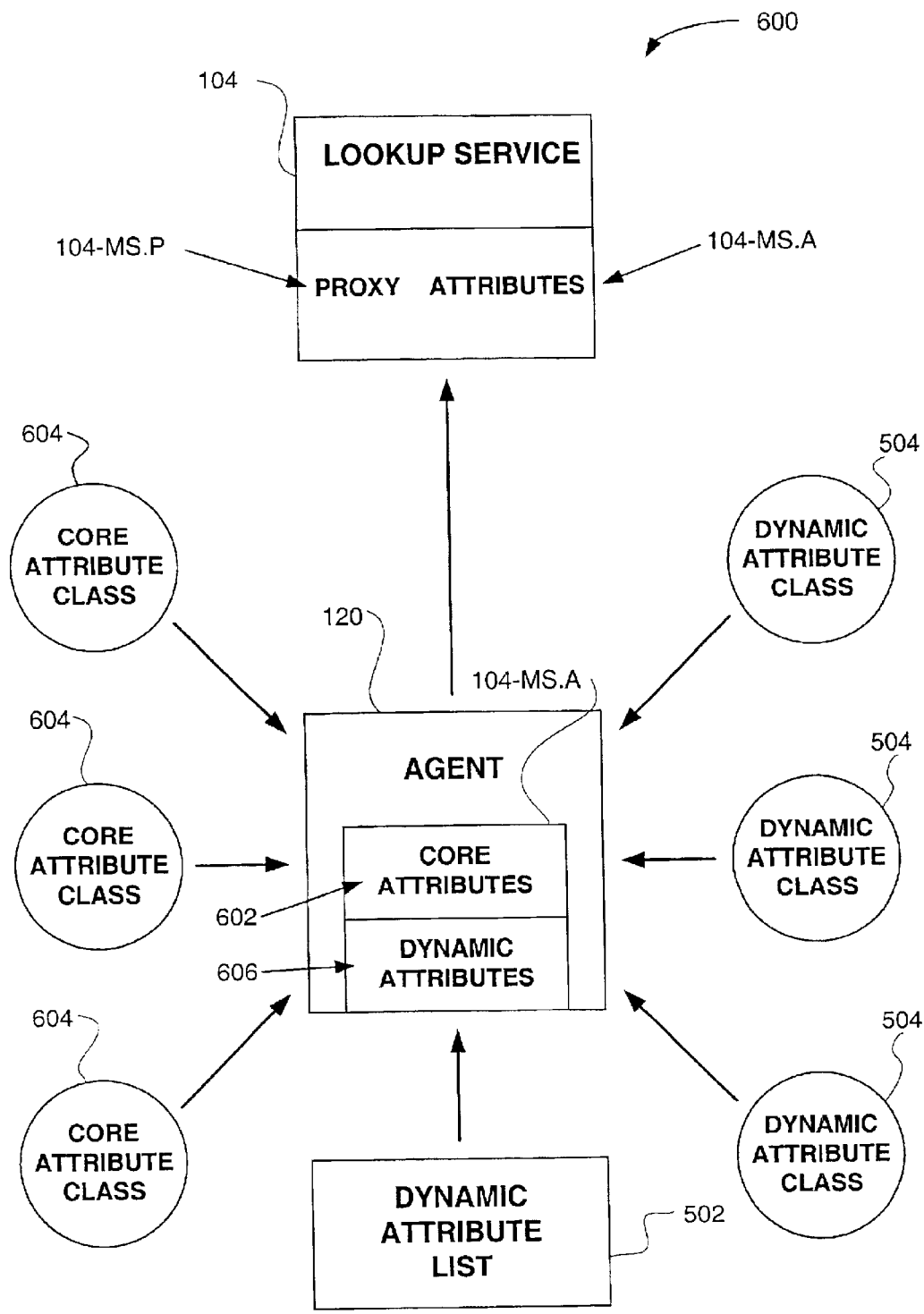
FIG. 6 is a logical diagram of a test system environment, in accordance with an embodiment of the present invention.

FIG. 6 is a logical diagram of a test system environment 600, in accordance with an embodiment of the present invention. The test system environment 600 includes an agent process 120, which includes attributes 104-MS.A of the test system. The test system attributes 104-MS.A are comprised of core attributes 602, derived from the core classes 604, and dynamic attributes 606, derived from the dynamic classes 504. The test system attributes 104-MS.A are also provided to the lookup service 104, which also includes a proxy 104-MS.P for the test system, as described above with respect to FIG. 3.

In operation, the agent process 120 begins by reading the core attribute classes 604. Since the core attribute classes 604 are deployed with the agent process 120, the agent process 120 is aware of the number and location of the core attribute classes 604. As mentioned above, the core attribute classes 604 provide test system attribute definitions for attributes usable by a wide variety of DTF systems, such as operating system types and hardware configurations.

To load the dynamic attribute classes 504, the agent processes utilizes the dynamic attribute list 502. In particular, the dynamic attribute list 502 provides a list of the dynamic attribute classes 504 that are available for the test system. In one embodiment, the dynamic attribute list 502 is a text file having a text line for each dynamic attribute class 504. The agent process 120 reads and processes the dynamic attribute list 502 to determine the number and location of the dynamic attribute classes 504. Having determined this information, the agent process 120 loads the dynamic attribute classes 504 from storage. Table 2 below includes illustrative code for processing a dynamic attribute list 502 file, in accordance with an embodiment of the present invention. Of course, the code can take any form so long as it provides a mechanism for obtaining dynamic attribute class information from a dynamic attribute list 502 file.

TABLE 2

```
public class MachineAttributes{
    public static Entry createEntry (String key, String value) {
        Entry rEntry = null;
        // convert the key, for example, "hardware.video.dpi" to "HardwareVideoDpi"
        String cname = "";
        StringTokenizer st = new StringTokenizer(key, ".");
        while (st.hasMoreTokens()) {
            StringBuffer sb = new StringBuffer((st.nextToken()).toLowerCase());
            String fchar = sb.substring(0,1);
            sb.replace(0, 1, fchar.toUpperCase());
            cname += sb.toString();
        }
        Constructor con = null;
        try {/* if this class is in package knight.attribute */
            Class ec = Class.forName("knight.attribute."+cname);
            Class[] parameterTypes = new Class[1];
            parameterTypes[0] = String.class;
                if (isDynamicAttribute(key) && value.equals("")){
                    con = ec.getConstructor(null);
                }else{
                    con = ec.getConstructor(parameterTypes);
                }
        } catch (Exception e) {
            try {/* if this class is in default package, an exception
                    will be thrown in the above code, so we try default
                        package once more.
                        We use Java Bean here to load the class and instantiate it,
                        this is also a process similar to java reflection
                */
                BasicEntry entry = (BasicEntry)java.beans.Beans.instantiate(null, cname);
                if (!value.equals("")) entry.setValue(value);
                return entry;
            } catch (Exception ex){
                throw new RuntimeException("Please, make sure that you've set correct
    attribute name in your test request file.\nDTF doesn't support the attribute \"" + key + "\",
    you specified.");
            }
        }
    }
    // instanciate it.
```

TABLE 2-continued

```
    try {
        Object[] initargs = new Object[1];
            if (isDynamicAttribute(key) && value.equals("")){
                rEntry = (Entry)con.newInstance(null);
            }else{
            initargs[0] = value;
            rEntry = (Entry)con.newInstance(initargs);
            }
        } catch (InstantiationException instExc) {
        System.err.println("Couldn't instantiate the class");
        instExc.printStackTrace();
        return rEntry;
        } catch (IllegalAccessException illigAcc) {
        System.err.println("Do not have enough permissions to instantiate the class");
        illigAcc.printStackTrace();
        return rEntry;
        } catch (InvocationTargetException invExc) {
            invExc.printStackTrace();
            return rEntry;
        }
        return rEntry;
    }
}
```

In addition to loading dynamic attribute classes 504 at startup, an agent process 120 of the embodiments of the present invention can load dynamic attribute classes during execution of the agent process 120, as described next with reference to FIG. 7.

Figure 7:
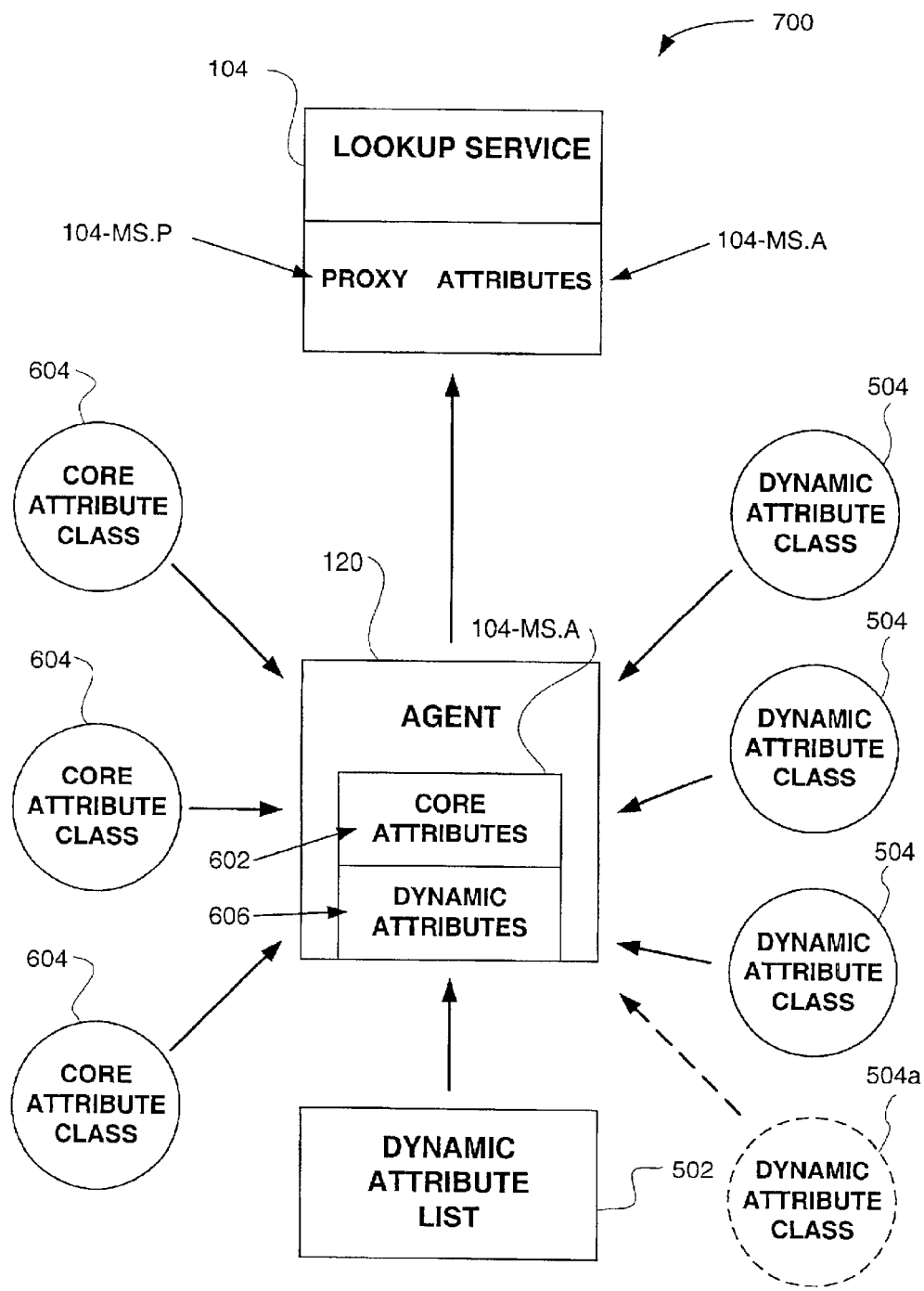
FIG. 7 is a logical diagram showing a test system environment, wherein a dynamic attribute has been added after execution, in accordance with an embodiment of the present invention.

FIG. 7 is a logical diagram showing a test system environment 700, wherein a dynamic attribute has been added after execution, in accordance with an embodiment of the present invention. As above, the test system environment 700 includes an agent process 120, which includes attributes 104-MS.A of the test system. The test system attributes 104-MS.A are comprised of core attributes 602, derived from the core classes 604, and dynamic attributes 606, derived from the dynamic classes 504. The test system attributes 104-MS.A are also provided to the lookup service 104, which also includes a proxy 104-MS.P for the test system.

In the example of FIG. 7, a user has added a new dynamic attribute class 504a after execution of the agent process 120. To make the new dynamic attribute class 504a available to the agent process 120, the user adds the new dynamic attribute class name to the dynamic attribute list 502. Upon reading the dynamic attribute list 502, the agent process 120 can determine the location of, and load, the new dynamic attribute class 504a, which is then added to the attributes 140-MS.A for the test system. Although, FIGS. 6 and 7 have been described with reference to master service attributes, it should be noted that the embodiments of the present invention apply equally to test service attributes as well.

One embodiment of the present invention utilizes Java Reflection™ (hereinafter "Reflection") to load the dynamic class files. Java Reflection allows class files to be loaded even though the classes may not be listed in the classpath. As mentioned previously, core attributes are known to the designer before the application is released. As such, they can be implemented in a non-complex manner. For example, an attribute with the name "network.hostname" generally can be included as a core attribute. According to one naming convention for attributes in the DTF, the attribute's class name can be NetworkHostname. To create an Entry, which is a Java class corresponding to the attribute, the following code segment can be used:

Entry rEntry=new NetworkHostname( );

In this case, the class NetworkHostname is a derived class of AbstractEntry, which implements interface Entry. The definition of the NetworkHostname class is created before the package is compiled so that the NetworkHostname class contructor and related methods are known.

Dynamic attributes, on the other hand, are not known at the time the DTF package is compiled. As such, the Entry contructor and the method used to set the value for a dynamic attribute is unknown until the user defines the name of the dynamic attribute in the dynamic attribute list. Hence, Reflection is used to load the dynamic classes. Using Reflection, the classes listed in the dynamic attribute list are loaded and the class contructors are obtained. The classes then are instantiated to get the objects that are the instances of the listed dynamic classes. In addition, a value can be assigned to the objects using the appropriate method.

Thus, to use a dynamic attribute, the user modifies the dynamic attribute list, and creates the code for the class with the name that matches the dynamic attribute. For example, if the dynamic attribute name is "software.os.longname," the user creates the Java code for the class "SoftwareOsLongname." Thereafter, the DTF is aware that a dynamic attribute has been added to the system. Hence, the DTF uses Reflection to load the class according to the name of the new dynamic attribute. The DTF then attempts to instantiate an object of the new dynamic attribute class. The instantiated object is the Entry that can be directly utilized in the Jini system.

The value of the Entry to a dynamic attribute can be either auto detected or user specified. For some dynamic attributes the user can assign a value to it in the constructor so that the DTF does not need to call another method to assign a value to the dynamic attribute. In one embodiment, the value for a dynamic attribute can be written in a disk file that keeps the values for all the attributes for the particular test system.

While the above described invention has been described in the general context of an application program that is executed on an operating system in conjunction with a test system, it should be appreciated that the invention may be implemented with other routines, programs, components, data structures, etc., which perform particular tasks or implement particular abstract data types. Furthermore, the invention may be practiced with other computer system configurations including hand-held devices, microprocessor systems, microprocessor-based or programmable consumer electronics, minicomputers, mainframe computers and the like.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for customizing attributes of a distributed processing system, comprising the operations of:
    loading at least one core attribute defining a first characteristic of a processing resource;
    reading a dynamic list file having information concerning a first dynamic attribute, wherein the first dynamic attribute defines a second characteristic of the processing resource;
    loading the first dynamic attribute utilizing the information in the dynamic list file; and
    registering the core attribute and the first dynamic attribute to a lookup service to advertise the availability of the processing resource to execute software processing jobs having a set of requirements.

2. A method as recited in claim 1, wherein the information in the dynamic attribute list includes a location of the first dynamic attribute and a name of the first dynamic attribute.

3. A method as recited in claim 2, wherein the first dynamic attribute is implemented as a class.

4. A method as recited in claim 3, wherein an agent process executing on the processing resource is utilized to load the first dynamic attribute and the core attribute.

5. A method as recited in claim 4, further comprising the operations of:
    adding a information concerning a second dynamic attribute to the dynamic attribute list file after the agent process, wherein the second dynamic attribute defines a third characteristic of the processing resource; and
    loading the second dynamic attribute after the agent process has begun executing.

6. A method as recited in claim 5, wherein the second dynamic attribute is implemented as a class.

7. A method as recited in claim 6, wherein the first dynamic attribute class and the second dynamic attribute class are each derived from a predefined parent attribute class.

8. A computer program embodied on a computer readable medium for customizing attributes of a distributed processing system, comprising:
    a code segment that loads at least one core attribute defining a first characteristic of a processing resource;
    a code segment that reads a dynamic list file having information concerning a first dynamic attribute, wherein the first dynamic attribute defines a second characteristic of the processing resource;
    a code segment that loads the first dynamic attribute utilizing the information in the dynamic list file; and
    a code segment that registers the core attribute and the first dynamic attribute to a lookup service to advertise the availability of the processing resource to execute software processing jobs having a set of requirements.

9. A computer program as recited in claim 8, wherein the information in the dynamic attribute list includes a location of the first dynamic attribute and a name of the first dynamic attribute.

10. A computer program as recited in claim 9, wherein the first dynamic attribute is implemented as a class.

11. A computer program as recited in claim 10, wherein an agent process executing on the processing resource is utilized to load the first dynamic attribute and the core attribute.

12. A computer program as recited in claim 11, further comprising:
    a code segment that reads information concerning a second dynamic attribute to the dynamic attribute list file after the agent process has begun executing, wherein the second dynamic attribute defines a third characteristic of the processing resource; and
    a code segment that loads the second dynamic attribute after the agent process has begun executing.

13. A computer program as recited in claim 12, wherein the second dynamic attribute is implemented as a class.

14. A computer program as recited in claim 13, wherein the first dynamic attribute class and the second dynamic attribute class are each derived from a predefined parent attribute class.

15. A system for customizing attributes of a distributed processing system, comprising:
    a lookup service capable of advertising attributes of a processing resource;
    a processing resource executing an agent process, wherein the agent process being in communication with the lookup service, and wherein the processing resource is capable of loading a set of core attributes defining characteristics of the processing resource;
    a plurality of dynamic attribute classes; and
    a dynamic attribute list file providing information concerning the dynamic attribute classes, wherein the agent process reads the dynamic attribute list to obtain the information concerning the dynamic attribute classes, and wherein the agent process loads the plurality of dynamic attribute classes utilizing the information concerning the dynamic attribute classes.

16. A system as recited in claim 15, further comprising a system controller that scans the lookup service to find processing resources having particular characteristics.

17. A system as recited in claim 16, wherein the system controller selects a processing resource from the processing resources based on the attributes of the processing resource advertised by the lookup service.

18. A system as recited in claim 17, further comprising a parent attribute class that defines particular characteristics of an attribute.

19. A system as recited in claim 18, wherein each dynamic attribute class is derived from the parent attribute class utilizing an inheritance property.

20. A system as recited in claim 19, wherein the agent process re-examines the dynamic list file when the dynamic list file is updated.

* * * * *